(12) United States Patent
Huang et al.

(10) Patent No.: US 8,416,646 B2
(45) Date of Patent: Apr. 9, 2013

(54) MAGNETIC RECORDING DISK DRIVE WITH SHINGLED WRITING AND RECTANGULAR OPTICAL WAVEGUIDE FOR WIDE-AREA THERMAL ASSISTANCE

(75) Inventors: Fu-Ying Huang, San Jose, CA (US); Jia-Yang Juang, Changhua (TW); Hal J. Rosen, Los Gatos, CA (US); Barry Cushing Stipe, San Jose, CA (US); Timothy Carl Strand, San Jose, CA (US); Petrus Antonius VanDerHeijden, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 17 days.

(21) Appl. No.: 13/190,410

(22) Filed: Jul. 25, 2011

(65) Prior Publication Data

US 2013/0028059 A1  Jan. 31, 2013

(51) Int. Cl.
G11B 11/00 (2006.01)
(52) U.S. Cl. .................................... 369/13.01
(58) Field of Classification Search .......... None
See application file for complete search history.

(56) References Cited

U.S. PATENT DOCUMENTS

| | | | |
|---|---|---|---|
| 5,986,978 A | 11/1999 | Rottmayer et al. | |
| 6,185,063 B1 | 2/2001 | Cameron | |
| 7,068,453 B2 | 6/2006 | Terris et al. | |
| 7,490,212 B2 | 2/2009 | Kasiraj et al. | |
| 2001/0006436 A1 | 7/2001 | Akiyama et al. | |
| 2005/0052957 A1* | 3/2005 | Kamimura et al. | 369/13.38 |
| 2005/0122850 A1* | 6/2005 | Challener et al. | 369/13.24 |
| 2006/0143635 A1* | 6/2006 | Liu et al. | 720/659 |
| 2007/0188922 A1 | 8/2007 | Tawa et al. | |
| 2008/0055763 A1 | 3/2008 | Tanaka et al. | |
| 2008/0212230 A1 | 9/2008 | Suh et al. | |
| 2009/0158305 A1* | 6/2009 | Seigler et al. | 720/658 |
| 2009/0207531 A1* | 8/2009 | Shiimoto et al. | 360/316 |
| 2009/0244778 A1* | 10/2009 | Hasegawa et al. | 360/234 |
| 2009/0258186 A1* | 10/2009 | Fontana et al. | 428/131 |
| 2010/0033865 A1 | 2/2010 | Hashimoto et al. | |
| 2010/0128382 A1 | 5/2010 | Maeda et al. | |
| 2010/0128579 A1 | 5/2010 | Seigler et al. | |
| 2010/0157745 A1* | 6/2010 | Okada et al. | 369/13.02 |
| 2010/0214685 A1 | 8/2010 | Seigler et al. | |
| 2010/0259845 A1 | 10/2010 | Miyauchi et al. | |
| 2010/0277827 A1* | 11/2010 | Wood et al. | 360/75 |
| 2011/0096431 A1* | 4/2011 | Hellwig et al. | 360/59 |
| 2011/0157738 A1* | 6/2011 | Shimazawa et al. | 360/59 |
| 2011/0170381 A1* | 7/2011 | Matsumoto | 369/13.33 |
| 2011/0235480 A1* | 9/2011 | Goulakov et al. | 369/13.35 |
| 2011/0249359 A1* | 10/2011 | Mochizuki et al. | 360/75 |
| 2012/0008229 A1* | 1/2012 | Zhou et al. | 360/59 |
| 2012/0127838 A1* | 5/2012 | Komura et al. | 369/13.32 |
| 2012/0201108 A1* | 8/2012 | Zheng et al. | 369/13.26 |
| 2012/0230167 A1* | 9/2012 | Aoyama et al. | 369/13.01 |
| 2012/0230168 A1* | 9/2012 | Izawa et al. | 369/13.32 |

\* cited by examiner

*Primary Examiner* — Adam R Giesy
*Assistant Examiner* — Henok Heyi
(74) *Attorney, Agent, or Firm* — Thomas R. Berthold (57) ABSTRACT

A thermally-assisted recording (TAR) disk drive uses "shingled" recording and a rectangular waveguide as a "wide-area" heat source. The waveguide generates a generally elliptically-shaped optical spot that heats an area of the recording layer extending across multiple data tracks. The waveguide core has an aspect ratio (cross-track width to along-the track thickness) that achieves the desired size of the heated area while locating the peak optical intensity close to the trailing edge of the write pole tip where writing occurs. The large cross-track width of the waveguide core increases the volume of recording layer heated by the optical spot, which reduces the rate of cooling. This moves the peak temperature point of the heated area closer to the write pole tip and reduces the temperature drop between the peak temperature and the temperature at the trailing edge of the write pole tip where writing occurs.

12 Claims, 7 Drawing Sheets

MAGNETIC RECORDING DISK DRIVE WITH SHINGLED WRITING AND RECTANGULAR OPTICAL WAVEGUIDE FOR WIDE-AREA THERMAL ASSISTANCE

RELATED APPLICATION

This application is related to application Ser. No. 13/102,959 filed May 6, 2011 and assigned to the same assignee as this application.

TECHNICAL FIELD

This invention relates generally to a thermally-assisted recording (TAR) system, in which data are written while the magnetic recording layer is at an elevated temperature, and more specifically to a TAR disk drive that uses shingled recording with a waveguide for directing laser radiation to an area of the disk wider than the data track to be recorded.

BACKGROUND OF THE INVENTION

In magnetic recording disk drives the magnetic material (or media) for the recording layer on the disk is chosen to have sufficient coercivity such that the magnetized data regions that define the data "bits" are written precisely and retain their magnetization state until written over by new data bits. As the areal data density (the number of bits that can be recorded on a unit surface area of the disk) increases, the magnetic grains that make up the data bits can be so small that they can be demagnetized simply from thermal instability or agitation within the magnetized bit (the so-called "superparamagnetic" effect). To avoid thermal instabilities of the stored magnetization, media with high magneto-crystalline anisotropy ($K_u$) are required. The thermal stability of a magnetic grain is to a large extent determined by $K_u V$, where V is the volume of the magnetic grain. Thus a recording layer with a high $K_u$ is important for thermal stability. However, increasing $K_u$ also increases the short-time switching field $H_0$ of the media, which is the field required to reverse the magnetization direction. For most magnetic materials $H_0$ is substantially greater, for example about 1.5 to 2 times greater, than the coercive field or coercivity $H_c$ measured on much longer time-scales. Obviously, the switching field cannot exceed the write field capability of the recording head, which currently is limited to about 12 kOe for perpendicular recording.

Since it is known that the coercivity of the magnetic material of the recording layer is temperature dependent, one proposed solution to the thermal stability problem is thermally-assisted recording (TAR), also called heat-assisted magnetic recording (HAMR), wherein the magnetic recording material is heated locally during writing to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed TAR systems, the magnetic recording material is heated to near or above its Curie temperature. The recorded data is then read back at ambient temperature by a conventional magnetoresistive (MR) read head.

Several TAR approaches have been proposed. TAR disk drives with a "small-area" heater direct heat to just the area of the data track where data is to be written by the write head. The most common type of small-area TAR disk drive uses a laser source and an optical waveguide with a near-field transducer (NFT). A "near-field" transducer refers to "near-field optics", wherein the passage of light is through an element with subwavelength features and the light is coupled to a second element, such as a substrate like a magnetic recording medium, located a subwavelength distance from the first element. NFTs typically use a low-loss metal (e.g., Au, Ag, Al or Cu) shaped in such a way to concentrate surface charge motion at a surface feature shaped as a primary apex or tip. Oscillating tip charge creates an intense near-field pattern. The electromagnetic field of the oscillating tip charge gives rise to optical output in the near field, which is directed onto to the magnetic recording medium to heat just the area exposed to the write field from the write head. Small-area heaters have the advantage that they do not cause adjacent-track erasure (ATE). If data tracks adjacent to the data track being written were to also be heated, the stray magnetic field from the write head may erase data previously recorded in the adjacent tracks. Also, even in the absence of a magnetic field, the heating of adjacent data tracks will accelerate the thermal decay rate over that at ambient temperature and thus data loss may occur. While providing the advantage of less ATE, small-area heaters are difficult to fabricate. Also, because of the relatively inefficient heat transfer the heater temperatures required to reach a desired media temperature are very high.

TAR disk drives with a "wide-area" heater that heat an area much wider than the data track were proposed prior to the proposal for "small-area" heaters. A wide-area heater, typically a waveguide coupled to a laser and with an output end near the media, is relatively easier to fabricate and implement in a conventional recording head structure than a small-area heater. However, wide-area heaters have been shown to result in substantial ATE if the peak temperature extends into the adjacent tracks. Additionally, the waveguide needs to be located very close to where writing occurs, i.e., the trailing edge of the write pole, so that there is a minimal temperature drop from the time the media is heated to its peak temperature to the time it is exposed to the write field.

Disk drives that use "shingled recording", also called "shingled-writing", have also been proposed. In shingled recording, the write head, which is wider than the read head in the cross-track direction, writes magnetic transitions by making a plurality of consecutive circular paths that partially overlap. The non-overlapped portions of adjacent paths form the data tracks, which are thus narrower than the width of the write head. The data is read back by the narrower read head. When data is to be rewritten, all of the data tracks in an annular band are also rewritten.

The previously-cited related application discloses a TAR disk drive with a "wide-area" heater that also uses shingled recording and avoids the problem of ATE.

What is needed is a TAR disk drive that uses shingled recording and that has an optical waveguide that minimizes the temperature drop between the peak temperature in the media and the temperature in the media at the trailing edge of the write pole, while keeping the required laser power low.

SUMMARY OF THE INVENTION

The invention relates to a thermally-assisted recording (TAR) disk drive that uses "shingled" recording and a rectangular waveguide as a "wide-area" heat source. The waveguide generates a generally elliptically-shaped optical spot that heats an area of the recording layer extending across multiple data tracks. The waveguide core has an aspect ratio (cross-track width to along-the track thickness) that achieves the desired size of the heated area while locating the peak optical intensity close to the trailing edge of the write pole tip where writing occurs. The large cross-track width of the waveguide core increases the volume of recording layer heated by the optical spot, which reduces the rate of cooling. This moves the peak temperature point of the heated area closer to the write pole tip and reduces the temperature drop between the peak temperature and the temperature at the trailing edge of the write pole tip where writing occurs. The waveguide core may extend across at least 10 tracks, preferably at least 20 tracks, and up to 120 tracks, and may have an aspect ratio between about 4 and 12.

In a modification of the rectangular waveguide, the rectangular core is formed of material with a first or high index-of-refraction. A waveguide cladding layer facing the write pole tip has a second index-of-refraction lower than the first or higher index-of-refraction of the core, and a waveguide cladding layer on the side opposite the side facing the write pole tip has an index-of-refraction intermediate the first and second indices of refraction. This results in an asymmetrical optical spot, with the optical intensity falling rapidly in the direction of the write pole tip and much more slowly in the opposite direction. Therefore, the size of the optical spot and volume of the heated recording layer is increased while maintaining the close separation between the core and the write pole tip. Thus the location of the peak temperature is moved closer to the trailing edge of write pole. The combination of a high aspect ratio for the core and the intermediate index-of-refraction cladding material enables an optimal trade-off between a low temperature drop and reasonable laser power.

For a fuller understanding of the nature and advantages of the present invention, reference should be made to the following detailed description taken together with the accompanying figures.

DETAILED DESCRIPTION OF THE INVENTION

Figure 1:
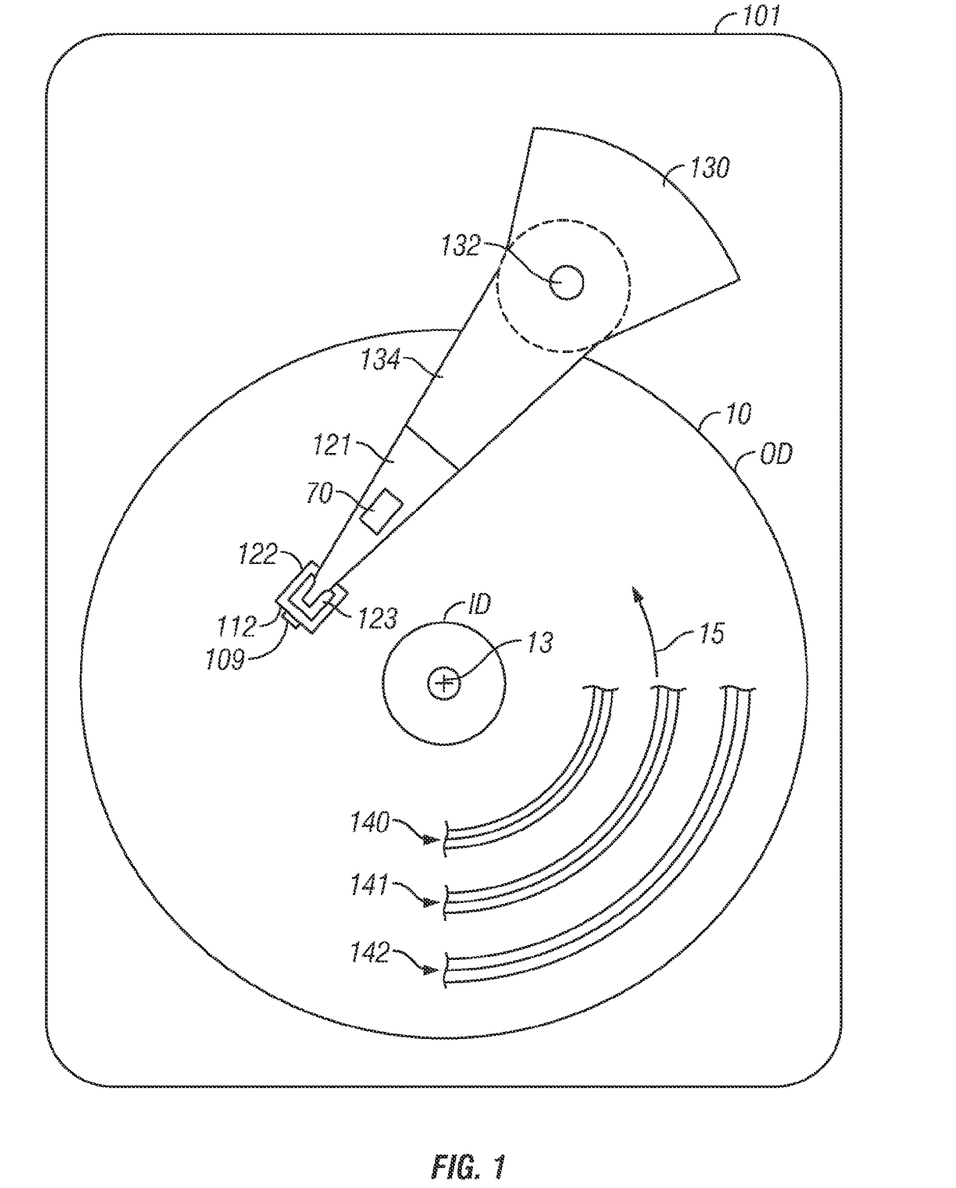
FIG. 1 is a top view of a thermally-assisted recording (TAR) disk drive with shingled recording according to the invention described in the previously-cited related application.

FIG. 1 is a top view of a thermally-assisted recording (TAR) disk drive with shingled recording according to the invention described in the previously-cited related application. The disk drive has a housing or base 101 that supports an actuator 130 and a spindle motor (not shown) for rotating the magnetic recording disk 10 about its center 13 in the direction indicated by arrow 15. The actuator 130 may be a voice coil motor (VCM) rotary actuator that has a rigid arm 134 and rotates about pivot 132. A head-suspension assembly includes a suspension 121 that has one end attached to the end of actuator arm 134, a flexure 123 attached to the other end of suspension 121, and a head carrier, such as an air-bearing slider 122, attached to the flexure 123. The suspension 121 permits the slider 122 to be maintained very close to the surface of disk 10 and the flexure 123 enables the slider 122 to "pitch" and "roll" on an air-bearing generated by the rotating disk 10. The slider 122 supports the read/write or recording head 109 located on the end face 112 of slider 122. The recording head 109 is typically a combination of an inductive write head with a magnetoresistive read head (also called a read/write head). A laser 70 is supported on suspension 121, but alternatively could be supported on arm 134 or slider 122. The slider 122 supports an optical channel or waveguide (not shown in FIG. 1) for directing radiation from laser 70 to the disk 10. Only one disk surface with associated slider and recording head is shown in FIG. 1, but there are typically multiple disks stacked on a hub that is rotated by a spindle motor, with a separate slider and recording head associated with each surface of each disk.

In this invention the disk drive uses shingled recording, also called shingled writing. Thus FIG. 1 also illustrates portions of the circular shingled recording data tracks grouped as annular bands on the recording layer of disk 10. Only portions of three bands 140, 141, 142 are depicted, but there would typically be a large number of bands. For example, for a 2.5 inch disk drive with shingled recording, the track pitch may be about 50 nm with each band containing several hundred tracks and with a separation between the bands of about 100 nm. In shingled recording the write head, which is wider than the read head in the cross-track direction, writes magnetic transitions by making a plurality of consecutive circular paths that partially overlap. The non-overlapped portions of adjacent paths form the data tracks, which are thus narrower than the width of the write head. The data is read back by the narrower read head. When data is to be rewritten, all of the data tracks in an annular band are also rewritten. Shingled writing is well-known in the art, for example as described in U.S. Pat. No. 6,185,063 B1.

Figure 2:
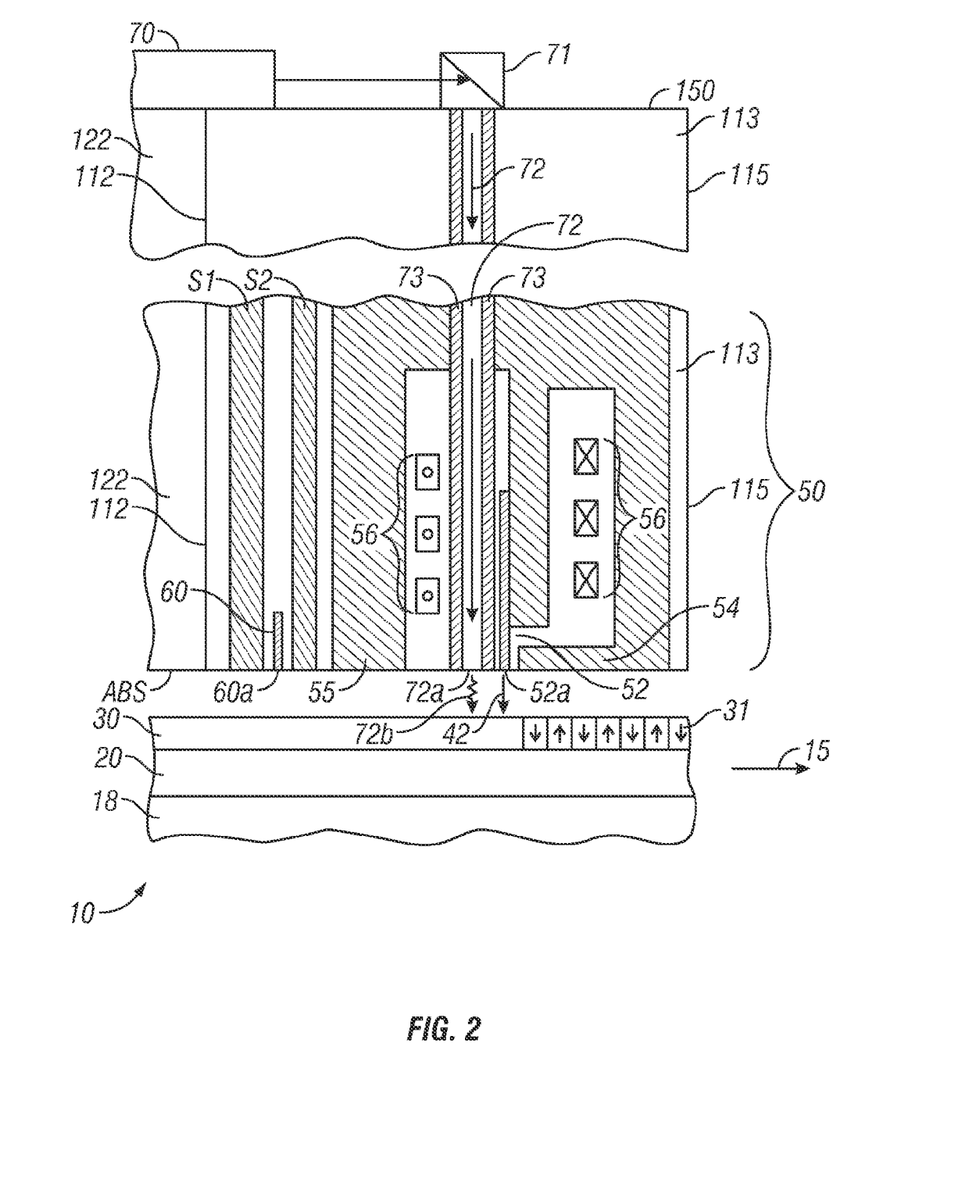
FIG. 2 is a sectional view through a portion of the TAR head and associated perpendicular magnetic recording disk of the disk drive shown in FIG. 1.

FIG. 2 is a sectional view through a portion of the TAR disk 10 and air-bearing slider 122 that functions as the head carrier with integrated TAR head formed on slider end 112. FIG. 2 is not drawn to scale because of the difficulty in showing the very small features. The TAR disk 10 is depicted as a perpendicular magnetic recording disk with a disk substrate 18, a continuous magnetic recording layer 30 with perpendicular magnetic anisotropy and an underlayer 20 that may function as a heat sink layer. The underlayer 20 may alternatively be a soft magnetic underlayer (SUL) that acts to carry the flux from the magnetic write field and would typically be located below an exchange break layer (EBL) (not shown) that breaks the magnetic exchange between the SUL and recording layer 30. The SUL may be a single layer formed of magnetically permeable materials, such as alloys of CoNiFe, FeCoB, CoCuFe, NiFe, FeAlSi, FeTaN, FeN, FeTaC, CoTaZr, CoFeTaZr, CoFeB, and CoZrNb, or a laminated structure formed of multiple soft magnetic films separated by nonmagnetic films, such as electrically conductive films like Al and CoCr or antiferromagnetic coupling films like Ru and Ir. The recording layer 30 is depicted with magnetized regions 31 that have been perpendicularly magnetized, meaning that they are stored in the recording layer 30 in a generally perpendicular or out-of-plane orientation, as shown by the arrows in regions 31. The recording layer 30 may be any high anisotropy (high $K_u$) perpendicular media, such as a cobalt-chromium-platinum (CoCrPt) alloy with a granular layer grown on a special growth-enhancing sublayer, or a multilayer of alternating films of Co with films of platinum (Pt) or palladium (Pd). The recording layer 30 may also be $Co_3Pt$ or CoSm, or an $L1_0$ ordered alloy such as FePt or FeNiPt. The disk 10 would also typically include a protective overcoat (not shown) over the recording layer 30.

Also shown on slider 122 with disk-facing surface or air-bearing surface (ABS) is the read/write head 109 (FIG. 1) with read head 60 and write head 50. Write head 50 includes a yoke that connects write pole 52 to a first return pole 54 and a second pole 55. The ABS of slider 122 is the surface that faces the disk 10 and is shown without the thin protective overcoat typically present in an actual slider. The ABS shall mean the surface of the head carrier that is covered with a thin protective overcoat, the actual outer surface of the head carrier if there is no overcoat, or the outer surface of the overcoat. Write current passes through a coil 56 of the write head 50 to generate a magnetic field (arrow 42) at the tip 52a of write pole 52. This magnetic field magnetizes the recording layer 30 beneath the write pole tip 52a as the disk 10 moves past the write head 50 in the direction of arrow 15. The detection or reading of the recorded regions 31 is by a read head 60 having a sensing edge 60a at the ABS that detects the transitions between the magnetic regions 31. The read head 60 is typically a magnetoresistive (MR) read head, such as a tunneling MR (TMR) read head in which a sense current passes perpendicularly through the layers making up the head. A pair of magnetically permeable shields S1 and S2 are located on opposite sides of read head 60 to prevent magnetic flux from magnetized regions 31 other than the region being read from reaching the read head sensing edge 60a. The write coil 56 is shown as a conventional helical coil wrapped around the portion of the yoke that directly supports the write pole 52, with the electrical current directions being shown as into the paper by the coil cross-sections marked with an "X" and out of the paper by the coil cross-sections marked with a solid circle. However, the coil may also be a conventional flat or "pancake" coil wrapped around the yoke. The slider 122 with integrated TAR head has an outer surface or trailing end 115 with electrically conductive pads (not shown) that connect through the insulating layers 113 to the read head 60 and coil 56 of write head 50.

The slider 122 also supports a laser 70, mirror 71, and an optical channel or waveguide 72 which has its output end 72a at the ABS. The laser 70 and mirror 71 are shown as being supported on the top surface 150 of slider 122. The optical waveguide 72 is depicted in FIG. 2 as extending through the yoke of write head 50 and being located between the write pole 52 and return pole 55. However the optical waveguide 72 may be located at other locations, such as between shield S2 and return pole 55. The waveguide 72 is formed of a core material such as $Ta_2O_5$ or another high index dielectric material that is transmissive to radiation at the wavelength of the laser and is surrounded by a dielectric cladding layer 73 (for example $SiO_2$ or $Al_2O_3$) of lower refractive index than the core material. While the slider 122 in FIG. 2 is depicted as supporting mirror 71 for directing the laser radiation from laser 70 into waveguide 72, it is known to use a grating coupler coupled to the waveguide, as described for example in US 20090310459 A1. Also, the laser 70 may be attached to slider 122 in a manner to be oriented orthogonal to top surface 150 so as to direct laser light directly into waveguide 72 without the need for mirror 71. The unshaded portions of the TAR head formed on slider end 112 in FIG. 2, with the exception of optical waveguide 72, represent insulating material, typically alumina. The laser 70 may be a CD-RW type laser diode with a wavelength of approximately 780 nm. The laser 70 may also be a vertical-cavity surface-emitting laser (VCSEL), or an external-cavity VCSEL that generates laser radiation with a wavelength between about 920 nm and 1000 nm.

The optical waveguide 72 directs radiation (represented by wavy arrow 72b) from its output end 72a to the recording layer 30 to heat the recording layer to lower the coercivity sufficient to ensure good writeabilty. In some implementations of TAR the recording layer may be heated to nearly or above the Curie temperature of the material making up the recording layer 30. During writing, the recording layer 30 moves relative to the slider 122 in the direction shown by arrow 15 so that the heated portion of the recording layer can be exposed to the write field 42 from the write pole tip 52a. The heating from radiation through optical waveguide 72 temporarily lowers the coercivity of the recording layer 30 so that the magnetic regions may be oriented by the write field 42 from write pole tip 52a. The magnetic regions become oriented by the write field 42 if the write field $H_w$ is greater than the switching field $H_0$. After a region of the recording layer 30 has been exposed to the write field from the write pole tip 52a and heat from the optical waveguide 72 it becomes written or recorded as a magnetized region 31 when it cools. The transitions between recorded regions 31 represent written data "bits" that can be read by the read head 60 with its sensing edge 60a at the ABS.

Figure 3:
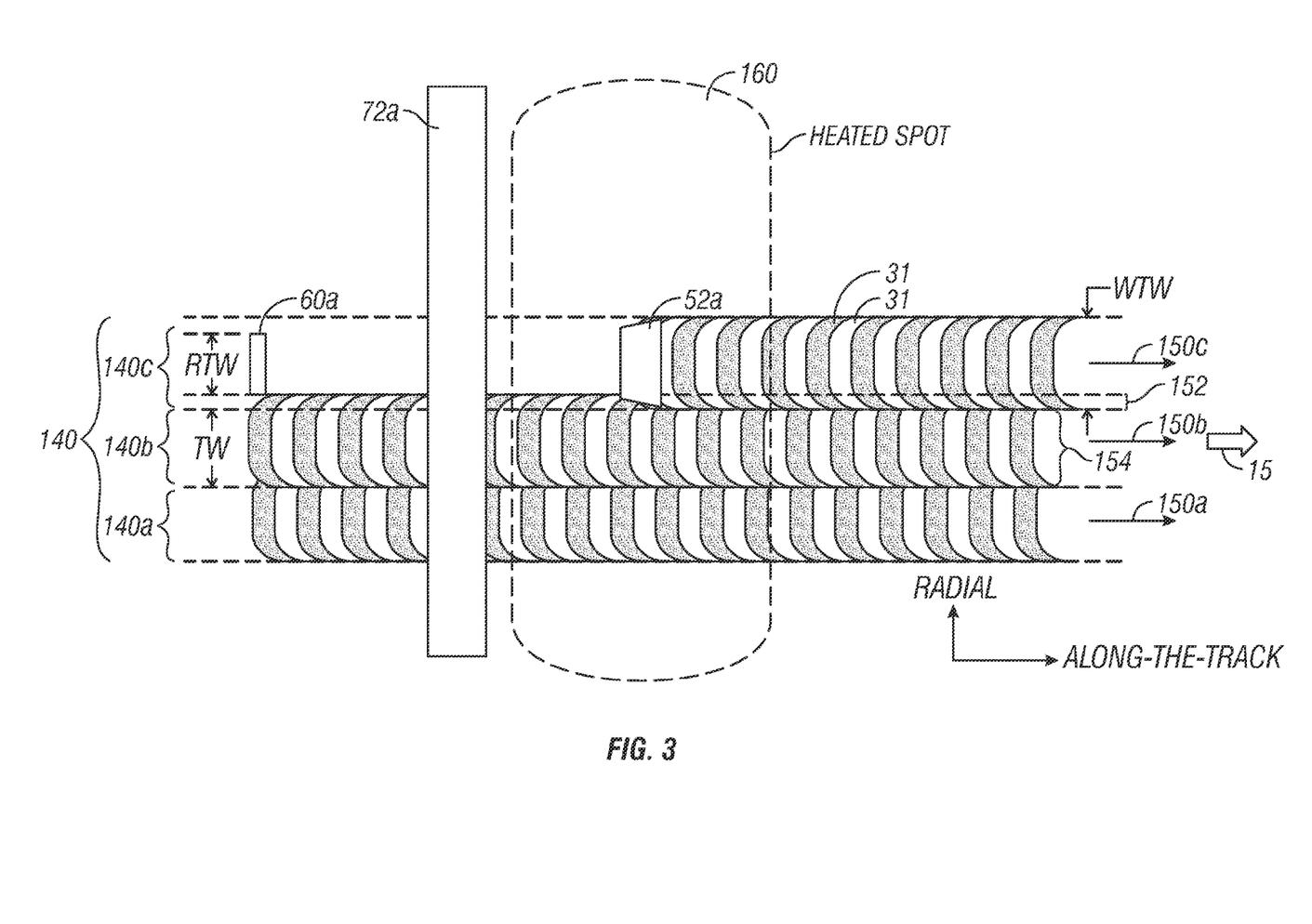
FIG. 3 is a view from below the recording layer of the disk toward the air-bearing surface (ABS) of the TAR head carrier and illustrates the method of shingled writing with thermal assistance from a rectangular waveguide wide-area heater according to the invention.

FIG. 3 is a view from below the recording layer of the disk toward the ABS and is intended to be a graphical representation of the method of recording magnetized regions on the disk using shingled writing with thermal assistance. Two concentric tracks 140a and 140b of an annular band 140 (FIG. 1) are shown, along with a path of magnetic transitions aligned with the write pole tip 52a that will result in a third data track. The write pole tip 52a has a cross-track width (WTW) that is wider than the read head sensing edge 60a cross-track width (RTW). When writing data, the write pole tip 52a generates paths of magnetic transitions (shown as the transitions between white and shaded magnetized regions 31) as the recording layer moves in the direction of arrow 15. In shingled writing all of the data tracks in an annular band are written whenever any portion of the data in an annular band is to be rewritten. To write the magnetic transitions that result in the three data tracks the write head first writes a path centered along line 150a, after which the actuator moves the write head radially by an incremental distance to write a path of magnetic transitions centered along line 150b, after which the actuator moves the write head radially by an incremental distance to write a path of magnetic transitions along line 150c. Path 150b overlaps a portion of path 150a and path 150c overlaps a portion of path 150b. For example, path 150b has an overlapped portion 152 and a non-overlapped portion 154. After all the tracks in an annular band have been written in the shingled writing method, the data tracks are the non-overlapped portions, as shown by data tracks 140a, 140b. The written data tracks thus have a radial track width (TW) that is typically slightly less than WTW and slightly greater than RTW of the read head sensing edge 60a. For example, RTW is typically 0.6 to 0.7 times TW.

As shown in FIGS. 2 and 3, the waveguide 72 (with output end 72a at the ABS) is not coincident with the write pole tip 52a, but is located up-track from the write pole tip 52a, preferably by a distance equal to or greater than 50 nm. Thus the waveguide output end 72a generates a laser spot that heats an area or spot 160 on the recording layer which then moves down-track where it can be exposed to the magnetic write field from the write pole tip 52a. As shown in FIG. 3, the waveguide output end 72a is a "wide-area" heater because it heats an area wider than TW and WTW, preferably an area that covers multiple tracks on both sides of the track aligned with the write pole tip 52a. The heated spot 160 may cover a relatively large number of tracks, for example if the TW is about 50 nm, the heated spot 160 may be about 1 micron, and thus cover about 20 tracks (10 tracks on each side of the write head). However, it is only when a portion of the recording layer in the heated spot 60 is exposed to the write field from the trailing edge of the write pole tip 52a that a magnetic transition is written. Thus the locations of the down-track transitions 31 in the circular path 150c are determined by the write field gradient of the write pole tip 52a and not the thermal gradient between the heated spot 160 and an unheated region of the recording layer. With such a wide-area heater, each time an entire annular band is written, the data in each data track will be exposed to the heat for successive passes after it has been written, for example at least 10 passes in this example. However, it has been determined from modeling that the use of a wide-area heater does not result in any significant ATE if the system is properly designed. As a result of the large heated spot there are a significant number of tracks that experience only temperature increases but no significant magnetic fields. During shingled writing only the adjacent tracks are exposed to the fringing magnetic field from the write head for a single head pass. The media can be designed to be sufficiently stable during this head pass to avoid ATE while allowing for an increase in areal density compared to traditional shingled recording without the use of heat.

In the preferred embodiment the recording layer 30 is a granular layer formed of a high-$K_u$ alloy comprising at least Co, Pt and Cr. Depending on the specific composition, a high-$K_u$ granular CoPtCr alloy may have a switching field $H_0$ at ambient temperature of greater than about 8 kOe and up to about 20 kOe. The heat source must reduce the coercivity $H_c$ enough so that $H_0$ is reduced to a value significantly below the write field. Depending on the specific composition of the CoPtCr alloy and the specific write head, the heat source should reduce the coercivity $H_c$ by at least 500 Oe, meaning that $H_0$ would be reduced by about at least 800 Oe. For example, a CoPtCr alloy may have a $K_u$ of approximately $7 \times 10^6$ ergs/cm$^3$ and a coercivity $H_c$ at ambient temperature of about 9 kOe, meaning that the switching field $H_0$ may be above 12 kOe. The heat source would raise the temperature in the heated spot 160 of the recording layer 30 to approximately 250° C. so that when exposed to the write field from the write pole tip 52a, the coercivity $H_c$ would be reduced by approximately 4 kOe (a switching field $H_0$ reduction of about at least 5 kOe). This temperature is substantially below the Curie temperature of the CoPtCr alloy, which would be approximately 600° C.

Figure 4:
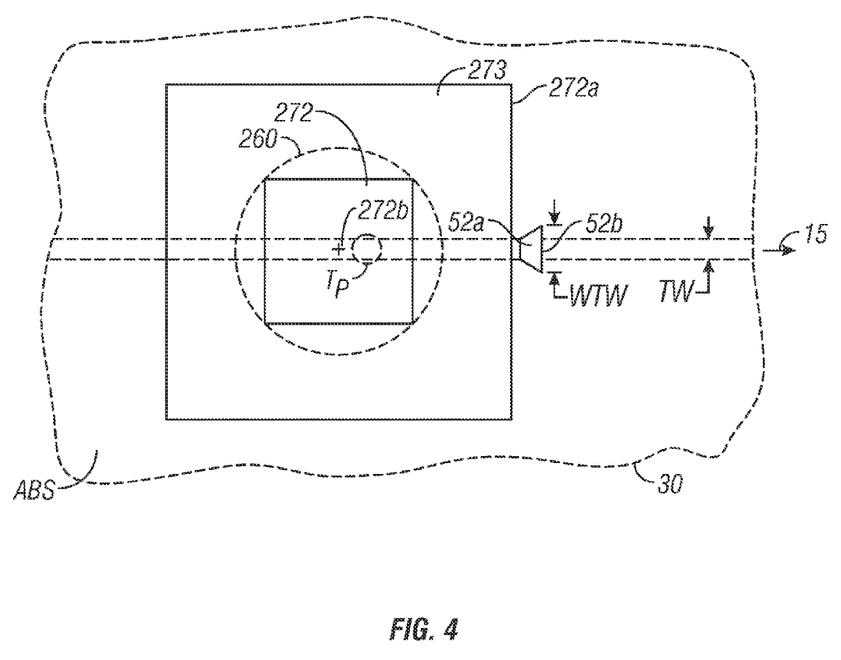
FIG. 4 is a view of the ABS showing the relative orientation of the write pole tip and generally circularly-shaped heated spot generated by a square waveguide wide-area heater.

FIG. 3 is merely a schematic representation of the optical waveguide with output end 72a and the along-the-track position of the heated spot 160 relative to the write pole tip 52a. The present invention relates to an optimal rectangular waveguide that generates a heated spot at close to the optimal along-the-track position relative to the write pole tip. In a wide-area TAR disk drive a relatively large volume of recording layer must be heated to increase the time the recording layer retains heat. This relatively large volume means that the heated spot should cover a relatively large area. FIG. 4 is a view of the ABS showing the relative orientation of the write pole tip 52a and generally circularly-shaped optical spot 260 generated by a square waveguide wide-area heater with waveguide core 272. A portion of recording layer 30 is depicted with a track having a track width TW. The recording layer 30 moves in the direction of arrow 15. In this example the waveguide core 272 has an output end 272a with square shape and is surrounded by cladding layer 273. As a result of the square-shaped core 272 the optical spot 260 has a generally circular shape. In this case the optical spot 260 has been made as small as possible to bring the center 272b of the spot close to the pole tip 52a without overlapping with the pole tip 52a to a significant degree. For example, the core 272 could be 300 nm×300 nm of $Ta_2O_5$ surrounded by a 200 nm thick $Al_2O_3$ cladding layer 273. The high index-of-refraction contrast between the $Ta_2O_5$ (n=2.1) and $Al_2O_3$ (n=1.6) results in a relatively small optical spot 260. The write pole tip 52a is depicted down-track from the center 272b of the waveguide output end 272a just outside the heated spot 260 because the write pole tip 52a should not be heated during writing. The peak temperature Tp of the recording layer 30 occurs slightly down-track of the center 272b of the waveguide core 272 due to the motion of the disk.

It is desirable to move the Tp point closer to the write pole tip 52a and decrease the temperature drop ΔT in the disk so the recording layer 30 is hotter at the location of the trailing edge 52b of the write pole tip 52a to thus assure that the region of the recording layer to be written is at or very close to the peak temperature Tp when it is exposed to the write field. This is accomplished by increasing the size of the waveguide optical spot and thus increasing the volume of recording layer heated because it will then take longer for the temperature to drop in the larger volume. Unfortunately, if the size of the roughly circular spot is increased by increasing the core size and/or reducing the index contrast, the optical spot will extend toward and possibly overlap the write pole tip 52a, potentially resulting in undesirable pole tip heating or optical loss.

Figure 5:
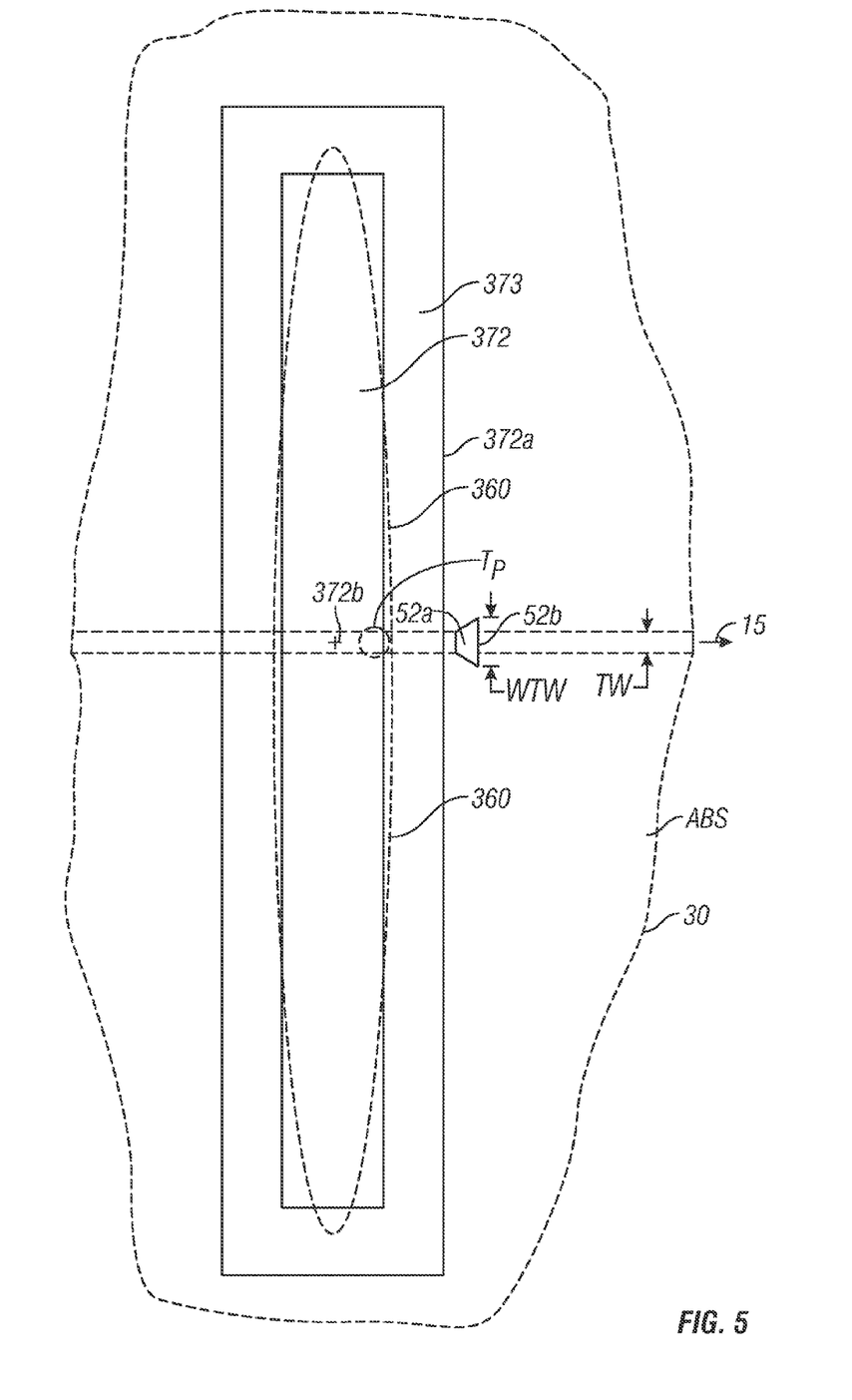
FIG. 5 is a view of the ABS showing the relative orientation of the write pole tip and generally elliptically-shaped wide-area heated spot generated by a rectangular waveguide with a rectangular core according to the invention.

In this invention the rectangular waveguide has an aspect ratio (cross-track width to along-the track thickness) that achieves the desired heated spot size or area while locating the peak optical intensity close to the trailing edge 52b of the write pole tip 52a to minimize the temperature drop. FIG. 5 is a view of the ABS showing the output end 372a of a rectangular waveguide according to the invention with a rectangular core 372 with center 372b and cladding layer 373, and the orientation of its generally oval or elliptically-shaped optical spot 360 relative to the write pole tip 52a. By increasing the cross-track width of the core 372, in this example to about 10× the cross-track width of the core 272 in FIG. 4, the volume of recording layer 30 heated by the optical spot 360 is increased, which reduces the rate of cooling. This moves the peak temperature point Tp closer to the write pole tip 52a and reduces the temperature drop ΔT between the peak temperature Tp and temperature at the trailing edge 52b of the write pole tip 52a where recording occurs. In one example, the core 372 may extend across at least 10 tracks, preferably at least 20 tracks and up to 120 tracks, depending on the TW. Thus the cross-track width of the core 372 would then be between about 20× and 120× the cross-track width of the trailing edge 52b of write pole tip 52a, depending on the TW.

Figure 6:
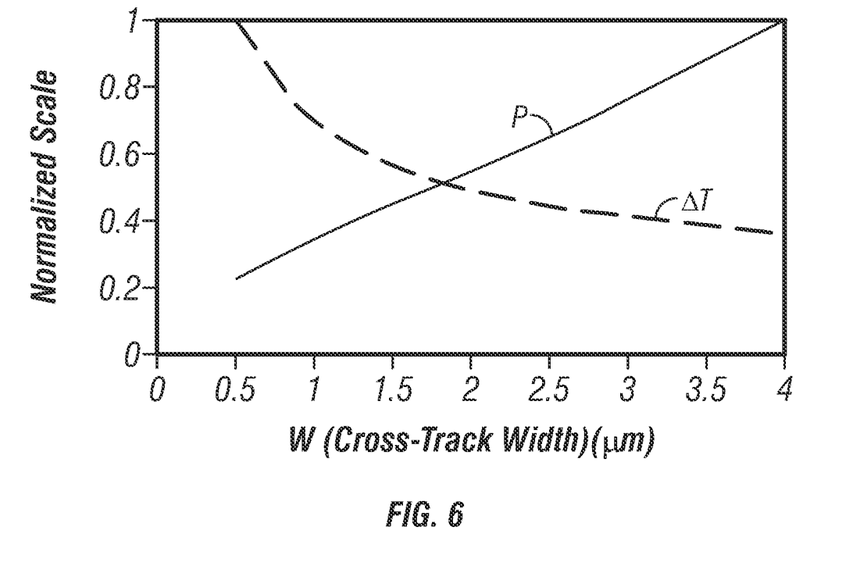
FIG. 6 is a graph of temperature drop and laser power to reach a specified temperature as a function of cross-track width to along-the-track thickness of a rectangular waveguide.

FIG. 6 is a graph of temperature drop ΔT and laser power P to reach a specified temperature for a waveguide core with an along-the-track thickness t of 0.25 μm as a function of waveguide cross-track width W with track width TW assumed to be about 0.05 μm (50 nm). FIG. 6 shows that the temperature drop ΔT decreases with increasing W, but beyond a certain value of W there is a generally linear increase in required laser power P with no significant reduction in ΔT. Rectangular waveguides with cross-track widths of about 1 to 3 µm (corresponding to aspect ratios of about 4 to 12) thus achieve a reduction in temperature drop ΔT without a significant increase in laser power P, and provide a significant improvement over a square waveguide. A waveguide with a cross-track width of about 1 to 3 µm would generate an elliptically-shaped spot with a long axis that would extend across about 20 to 60 tracks for a disk with a TW of about 50 nm, and across about 40 to 120 tracks for a disk with a TW of about 25 nm.

An alternative description for the rectangular waveguide according to the invention that achieves the desired heated spot size while minimizing the temperature drop is by an alternative ratio, specifically the ratio of waveguide cross-track width to the distance from the waveguide core center to the magnetic location of writing, i.e., the trailing edge of the write pole tip. For example, in FIG. 5 this would be the ratio of the cross-track width of waveguide core 372 to the along-the-track distance from waveguide core center 372b to trailing edge 52b of write pole tip 52a. The objective is to minimize ΔT, which modeling has shown can be decreased by increasing the cross-track spot width. The modeling shows that ΔT is minimized for a cross-track spot width of 12 times the along-the-track distance from waveguide core center 372b to the trailing edge 52b of write pole tip 52a. However, this alternative ratio can be as small as 2 and still result in a reduction in ΔT. In one example, the waveguide along-the-track thickness, which should be minimized to minimize the spacing to the write pole tip trailing edge, is 0.25 µm. The along-the-track thickness of the write pole, including spacing to the waveguide, is 0.125 µm. With the trailing edge of the write pole being the location of writing, the distance of the waveguide core center to the location of writing is 0.25 µm, so a waveguide cross-track width of 3 µm would result in a ratio of 12. In another example, the waveguide along-the-track thickness is also 0.25 µm, but the total along-the-track distance from the waveguide core center to the trailing edge of the write pole tip is 0.4 µm. A value of 2 for this alternative ratio would reduce but not minimize ΔT, and would yield a waveguide cross-track width of 0.8 µm, or close to the 1 µm value obtained from FIG. 6.

Figure 7:
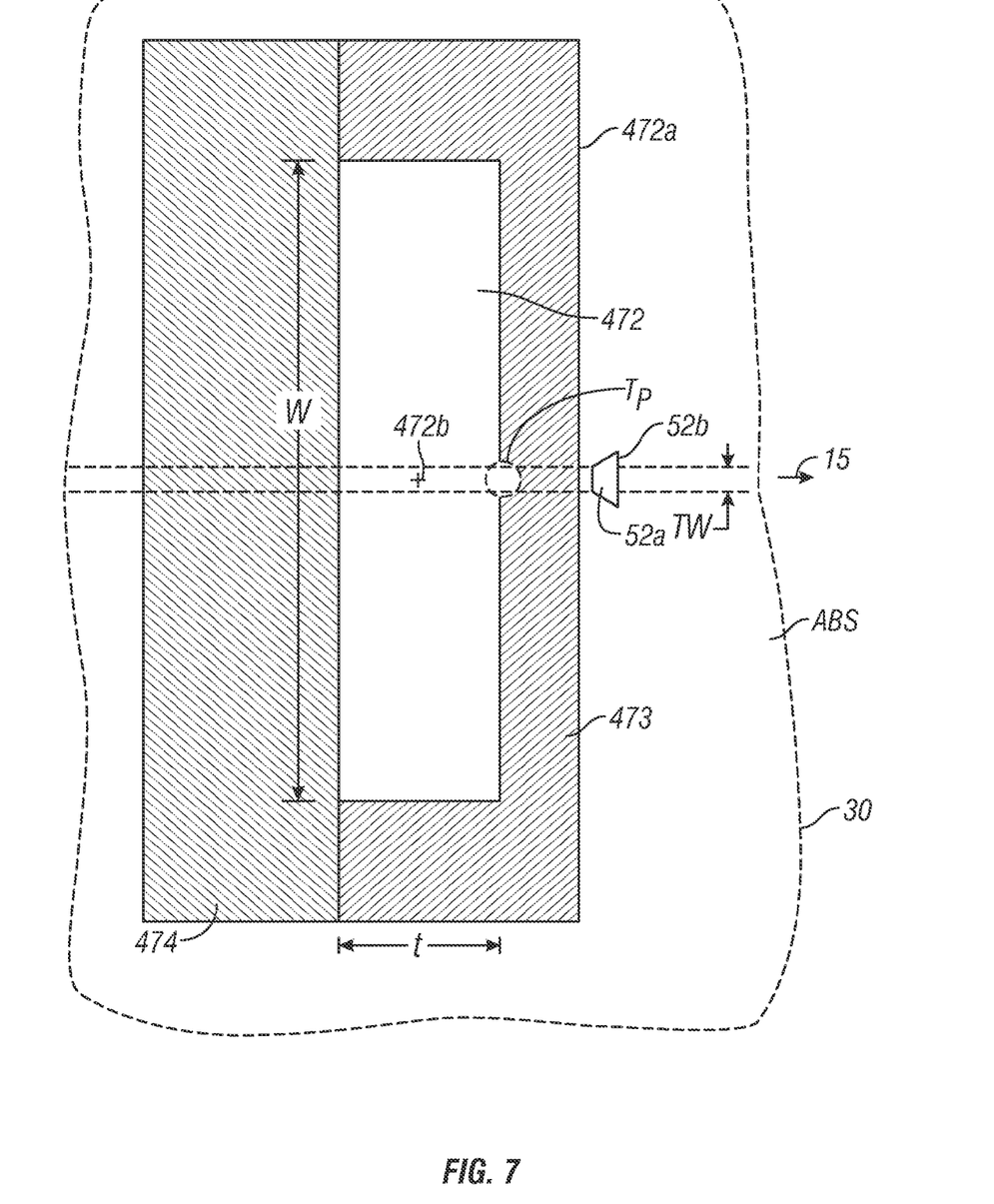
FIG. 7 is a view of the ABS showing the relative orientation of the write pole tip and a rectangular waveguide with different cladding layers on opposite sides of the waveguide core according to the invention.

FIG. 7 shows a modification to the rectangular waveguide depicted in FIG. 5. The laser spot size from a rectangular waveguide decreases with an increase in the difference between the high index-of-refraction core and the lower index-of-refraction cladding. Typically the same cladding material surrounds the core, so that the optical spot is generally symmetric about the center of the core. Thus for a waveguide used in conjunction with a near-field transducer (NFT) for a "small-area" TAR system, a small spot size is desired so the core material may be $Ta_2O_5$ with a high index-of-refraction of about 2.1 and the cladding material may be $Al_2O_3$ with a low index-of-refraction of about 1.6. In the modification shown in FIG. 7, the waveguide has an output end 472a and a rectangular core 472 with a physical center 472b formed of material with a first or high index-of-refraction. A cladding layer 473 is located on the side of core 472 facing the write pole tip 52a with a second index-of-refraction lower than the first or higher index-of-refraction of the core 472. A cladding layer 474 with an index-of-refraction intermediate the first and second indices is located on the side of the core 472 opposite the side facing the write pole tip 52a. The different cladding layers surrounding the core will cause the laser spot to be asymmetrical, with the optical intensity falling rapidly in the direction of the write pole tip 52a and much more slowly in the up-track direction. Therefore, the size of the optical spot and volume of heated recording layer has been increased while maintaining the close separation between the core 472 and write pole tip 52a. Thus the location of the peak temperature Tp is moved closer to the trailing edge 52b of write pole tip 52a. By using a combination of a high aspect ratio for the core and intermediate index-of-refraction material for cladding layer 474 on the up-track side of the core 472, it is possible to obtain an optimal trade-off between low temperature drop ΔT and reasonable laser power P. As one example of an embodiment shown in FIG. 7, the TW may be about 50 nm, the along-the-track thickness t of the core 472 may be between about 0.3 to 0.5 µm (300-500 nm) and the cross-track width W of the core 472 may be between about 1 to 3 µm, which means that W would extend across about 20 to 60 tracks for a TW of 50 nm. Cladding layer 473 may have a typical along-the-track thickness of 0.3 µm and cladding layer 474 may have a typical along-the-track thickness of 0.5 to 2 µm. The core 472 may be $Ta_2O_5$ with a high index-of-refraction of about 2.1, the cladding layer 473 may be $SiO_2$ or $Al_2O_3$ with a lower index-of-refraction of about 1.46 and 1.6, respectively, and the cladding layer 474 may be may be a $SiO_2$—$Ta_2O_5$ composite or $Al_2O_3$—$Ta_2O_5$ composite with an intermediate index-of-refraction of about 1.8 to 2.0. Various composite materials can be formed by co-sputtering to obtain a material with the desired index-of-refraction.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive slider having a disk-facing surface and comprising:
   an optical waveguide having a generally rectangularly-shaped light-emitting output end at the disk-facing surface, the waveguide output end having a thickness in a first direction and a width in a second direction orthogonal to the first direction and greater than the thickness in said first direction, and wherein there is no near-field transducer (NFT) on the slider;
   a write head having a write pole tip at the disk-facing surface with a trailing edge spaced from the waveguide output end in the first direction, the pole tip having a width in the second direction less than the width of the waveguide; and
   a read head having a sensing edge at the disk-facing surface and spaced from the waveguide output end in the first direction on the side of the waveguide opposite the write pole tip.

2. The disk drive slider of claim 1 wherein the waveguide aspect ratio of the width to thickness is greater than or equal to 4 and less than or equal to 12.

3. The disk drive slider of claim 1 wherein the ratio of the width of the waveguide output end to the distance from the center of the waveguide output end to the trailing edge of the write pole tip is greater than or equal to 2 and less than or equal to 12.

4. The disk drive slider of claim 1 wherein the optical waveguide is a rectangular waveguide having a core with a first index-of-refraction, a cladding layer with a second index-of-refraction less than said first index-of-refraction on the side of the core facing the pole tip, and a cladding layer with an index-of-refraction between said first and second indices of refraction on the side of the core opposite the side facing the pole tip.

5. The disk drive slider of claim 4 wherein the core is formed essentially of $Ta_2O_5$, the cladding layer on the side of the core facing the pole tip is formed essentially of one of $SiO_2$ and $Al_2O_3$, and the cladding layer on the side of the core opposite the side facing the pole tip is formed of a composite selected from $SiO_2$—$Ta_2O_5$ and $Al_2O_3$—$Ta_2O_5$.

6. A thermally-assisted shingled-writing magnetic recording disk drive comprising:
- a rotatable magnetic recording disk comprising a substrate and a perpendicular magnetic recording layer on the substrate for storing data in a plurality of generally concentric tracks;
- a slider having an air-bearing surface (ABS) facing the recording layer;
- a laser;
- an optical waveguide on the slider and coupled to the laser, the waveguide having a generally rectangularly-shaped laser radiation output end at the ABS, the waveguide output end having an along-the-track thickness and a cross-track width greater than the along-the-track thickness for generating an optical spot on the disk to heat an area of the recording layer as the disk rotates, the optical spot having a generally elliptical shape with its long axis extending across multiple tracks, and wherein there is no near-field transducer (NFT) on the slider;
- a write head on the slider and having a write pole tip at the ABS with a trailing edge spaced down-track from the waveguide output end in the along-the-track direction, the pole tip generating at its trailing edge a magnetic write field to magnetize regions of the recording layer in the heated area, the magnetized regions having a cross-track width generally equal to the cross-track width of the write pole;
- an actuator connected to the slider for moving the slider generally radially across the disk, the actuator being capable of moving the pole tip in an increment less than the cross-track width of the pole tip, whereby the pole tip may generate partially overlapping generally circular paths of magnetic regions with the non-overlapping generally circular paths of magnetic regions forming the concentric tracks; and
- a read head having a sensing edge at the ABS for reading magnetized regions in the tracks.

7. The disk drive of claim 6 wherein the ratio of the optical waveguide's cross-track width to its along-the-track thickness being greater than or equal to 4 and less than or equal to 12.

8. The disk drive of claim 6 wherein the ratio of the width of the waveguide output end to the distance from the center of the waveguide output end to the trailing edge of the write pole tip is greater than or equal to 2 and less than or equal to 12.

9. The disk drive of claim 6 wherein the long axis of the generally elliptically-shaped optical spot extends across at least 20 tracks.

10. The disk drive of claim 9 wherein the long axis of the generally elliptically-shaped optical spot extends across at least 40 tracks and up to 120 tracks.

11. The disk drive of claim 6 wherein the optical waveguide is a rectangular waveguide having a core with a first index-of-refraction, a cladding layer with a second index-of-refraction less than said first index-of-refraction on the side of the core facing the pole tip, and a cladding layer with an index-of-refraction between said first and second indices of refraction on the side of the core opposite the side facing the pole tip.

12. The disk drive of claim 11 wherein the core is formed essentially of $Ta_2O_5$, the cladding layer on the side of the core facing the pole tip is formed essentially of one of $SiO_2$ and $Al_2O_3$, and the cladding layer on the side of the core opposite the side facing the pole tip is formed of a composite selected from $SiO_2$—$Ta_2O_5$ and $Al_2O_3$—$Ta_2O_5$.

* * * * *